(12) United States Patent
Mossoba et al.

(10) Patent No.: US 10,354,177 B1
(45) Date of Patent: Jul. 16, 2019

(54) CREDIT CARD WITH CHROMOGENIC FEATURES

(71) Applicant: Capital One Services, LLC, McLean, VA (US)

(72) Inventors: Michael Mossoba, Arlington, VA (US); Abdelkader Benkreira, Washington, DC (US); Joshua Edwards, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/031,053

(22) Filed: Jul. 10, 2018

(51) Int. Cl.
*G06K 19/06* (2006.01)

(52) U.S. Cl.
CPC .............................. *G06K 19/06196* (2013.01)

(58) Field of Classification Search
CPC ............ B42D 2035/20; B42D 2035/24; B42D 2035/44; B42D 25/00; B42D 25/22; B42D 25/29; B42D 25/378; G06K 19/04; G06K 19/06018; G06K 2017/0067; G06K 2019/06225; G06Q 20/342
USPC ........................................................ 235/493
See application file for complete search history.

(56) References Cited

U.S. PATENT DOCUMENTS

| 5,282,651 | A | | 2/1994 | Alonso | |
|---|---|---|---|---|---|
| 5,551,973 | A | * | 9/1996 | Oliver | C09D 11/34 106/31.25 |
| 5,593,486 | A | * | 1/1997 | Oliver | C09D 11/34 106/31.3 |
| 5,858,564 | A | * | 1/1999 | Tamura | H05B 33/14 252/301.16 |
| 7,347,382 | B2 | | 3/2008 | Ferber et al. | |
| 7,628,336 | B2 | | 12/2009 | Reynolds et al. | |
| 2005/0243391 | A1 | * | 11/2005 | Drinkwater | B42D 15/025 359/31 |
| 2008/0116276 | A1 | * | 5/2008 | Lo | G06K 19/06018 235/462.01 |
| 2008/0123991 | A1 | * | 5/2008 | Lo | G09F 3/0292 382/276 |
| 2008/0290178 | A1 | * | 11/2008 | Reynolds | G06Q 20/342 235/494 |
| 2009/0322070 | A1 | * | 12/2009 | Reichelsheimer | B41M 3/142 283/5 |
| 2011/0073659 | A1 | * | 3/2011 | Lawyer | G06K 19/04 235/488 |

* cited by examiner

*Primary Examiner* — Thien M Le
(74) *Attorney, Agent, or Firm* — Finnegan, Henderson, Farabow, Garrett & Dunner, LLP

(57) ABSTRACT

A credit card with an obscurable account identifier. The credit card further comprises a substrate defining a first surface with a chromogenic feature wherein the chromogenic feature is capable of changing from a first state and a second state based on an activating trigger. In the first state, the chromogenic feature appears with a first optical property that obscures the account identifier, and in the second state, the chromogenic feature appears with a second optical property that reveals the account identifier.

15 Claims, 12 Drawing Sheets

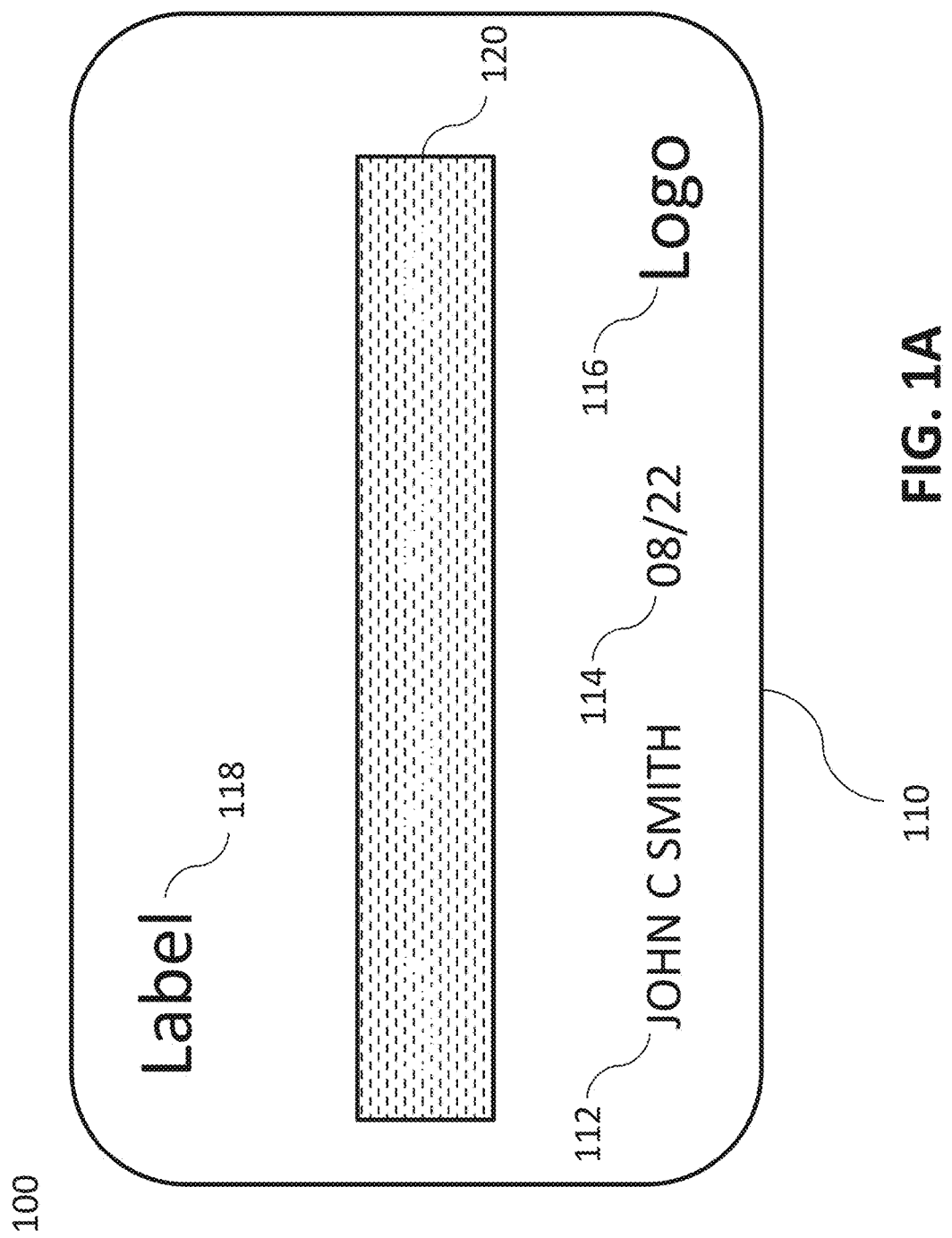

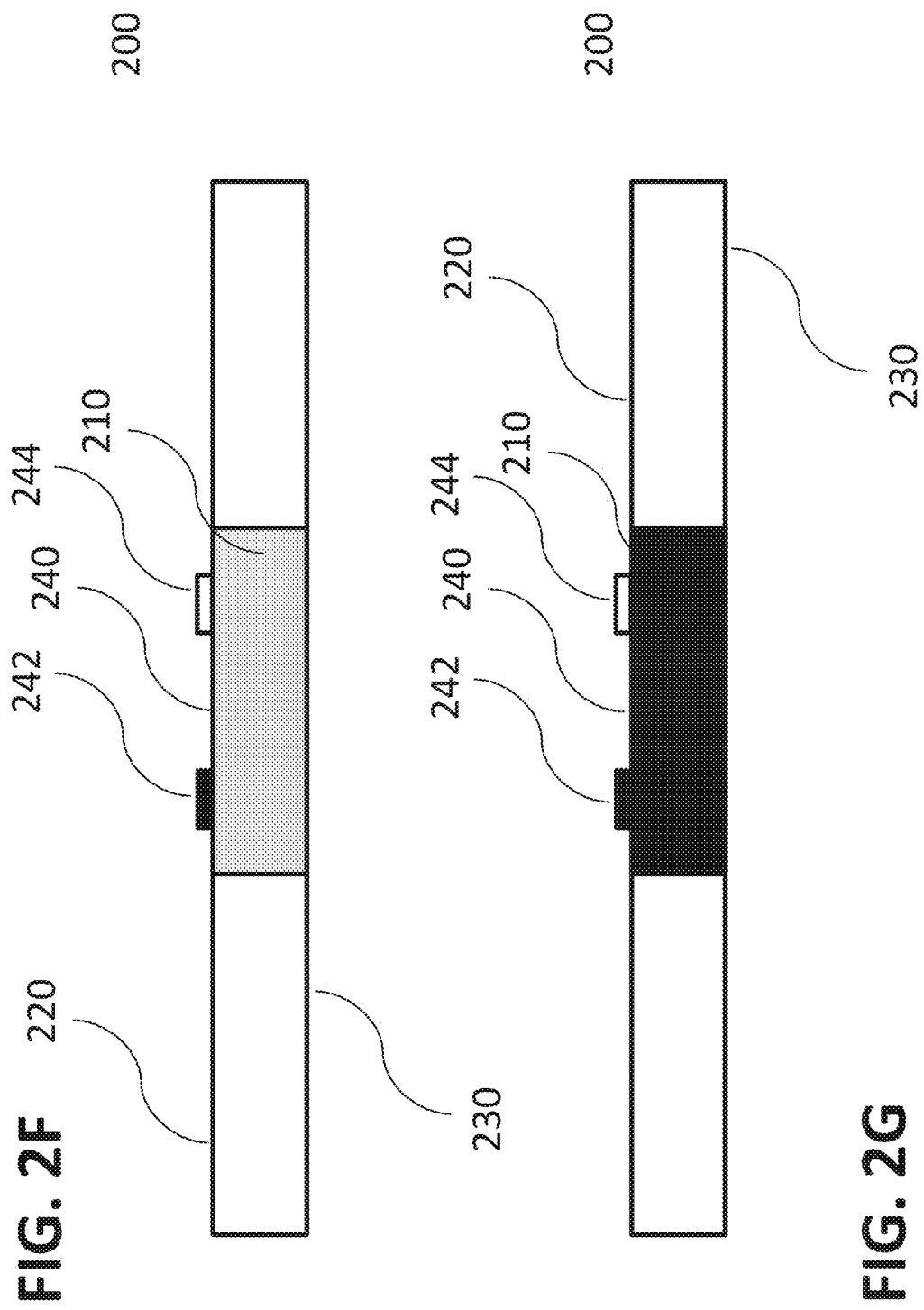

CREDIT CARD WITH CHROMOGENIC FEATURES

TECHNICAL FIELD

The present disclosure generally relates to credit cards with chromogenic features.

BACKGROUND

Credit card theft is more common in public settings when the card is exposed to the public eye. Credit card theft is problematic and burdensome for both card users and card issuers alike.

As one example, a credit card user leaves his card on a restaurant table, indicating he is ready to pay the bill. However, any passer-by, including the restaurant staff, can easily copy the essential credit card information such as the account identifier, expiration date, users' address, security code, etc. This snooping can be accomplished without the user ever being aware.

As another example, a snooping thief may steal and copy credit card information by merely copying the displayed user information. Then a card issuer may discover a credit card simultaneous used in unrelated and distant places. Fraud may be detected, but the card issuer may have problems determining the correct card versus the stolen card. Additionally, the card issuer will likely need to utilize resources not previously required, either for fraudulent charge liability or card reissuance.

Moreover, while some credit card theft solutions exist, none are as easy and practical as the means described herein—a credit card device that obscures necessary account information to the naked snooping eye. The present disclosure provides devices and methods to solve these snooping theft issues and other problems.

SUMMARY

In the following description, certain aspects and embodiments of the present disclosure will become evident. It should be understood that the disclosure, in its broadest sense, could be practiced without having one or more features of these aspects and embodiments. Specifically, it should also be understood that these aspects and embodiments are merely exemplary. Moreover, although disclosed embodiments are discussed in the context of a credit card, the disclosed embodiments are not limited to any particular industry.

Disclosed embodiments include a credit card with an obscurable account identifier. The credit card comprises a substrate defining a first surface with a chromogenic feature wherein the chromogenic feature is capable of changing from a first state and a second state based on an activating trigger. In the first state, the chromogenic feature appears with a first optical property that obscures the account identifier, and in the second state, the chromogenic feature appears with a second optical property that reveals the account identifier.

Embodiments further include a credit card with an obscurable account identifier comprising a substrate composed of a chromogenic material defining a first surface. The account identifier is printed on the first surface, wherein the chromogenic material is capable of changing from a first state to a second state based on an activating trigger. In the first state, the chromogenic material appears with a first optical property that obscures the account identifier. And in the second state, the chromogenic material appears with a second optical property that reveals the account identifier.

Another embodiment further includes a credit card with an obscurable account identifier. The card comprises a first substrate comprised of a first chromogenic material defining a first surface, and a second substrate comprised of a second chromogenic material attached to a portion of the first substrate and defining a second surface on a parallel plane to the first surface. The first material is capable of changing from a first state to a second state based on a first activating trigger, and the second chromogenic material is capable of changing from a third state to a fourth state based on a second activating trigger. When the first chromogenic material is in the first state and the second material is in the third state, the account identifier is obscured, and when the first material is in the second state and the second material is in the fourth state, the account identifier is revealed. In some embodiments, the first trigger and the second trigger are different; in some embodiments, the first trigger and the second trigger are identical (i.e., the same trigger activates the change in both the first and second chromogenic materials).

Disclosed embodiments further include a method of providing a credit card with an obscurable account identifier. The method comprises printing a background on at least a portion of a first surface of a substrate and printing an account identifier for a user account on a portion of the background in thermochromic ink, where the ink is configured to transition between a first optical appearance and a second optical appearance when the thermochromic ink is heated above an activation temperature.

Disclosed embodiments also include a method of providing a credit card with an obscurable account identifier. The method comprises printing an account identifier for a user account on the surface of the credit card in thermochromic ink, where the ink is configured to transition between a first optical appearance and a second optical appearance when the thermochromic ink is heated above an activation temperature. The method further comprises covering the printed account identifier with a photochromic feature configured to transition between a first optical appearance and a second optical appearance when the photochromic feature is radiated by light wavelengths. In certain embodiments, the wavelength of the activating light is between about 0.29 μm and about 3.2 μm. In other embodiments, the activation trigger is mechanical friction (e.g., tribochromism).

It is to be understood that both the foregoing general description and the following detailed description are exemplary and explanatory only, and are not restrictive of the disclosed embodiments, as claimed.

BRIEF DESCRIPTION OF DRAWINGS

The accompanying drawings, which are incorporated in and constitute a part of the specification, illustrate several embodiments and, together with the description, serve to explain the disclosed principles. In the drawings:

FIG. 1A depicts an exemplary credit card device, consistent with disclosed embodiments.

FIG. 2F depicts an exemplary credit card device, consistent with disclosed embodiments.

FIG. 2G depicts an exemplary credit card device, consistent with disclosed embodiments.

DETAILED DESCRIPTION

Figure 1B:
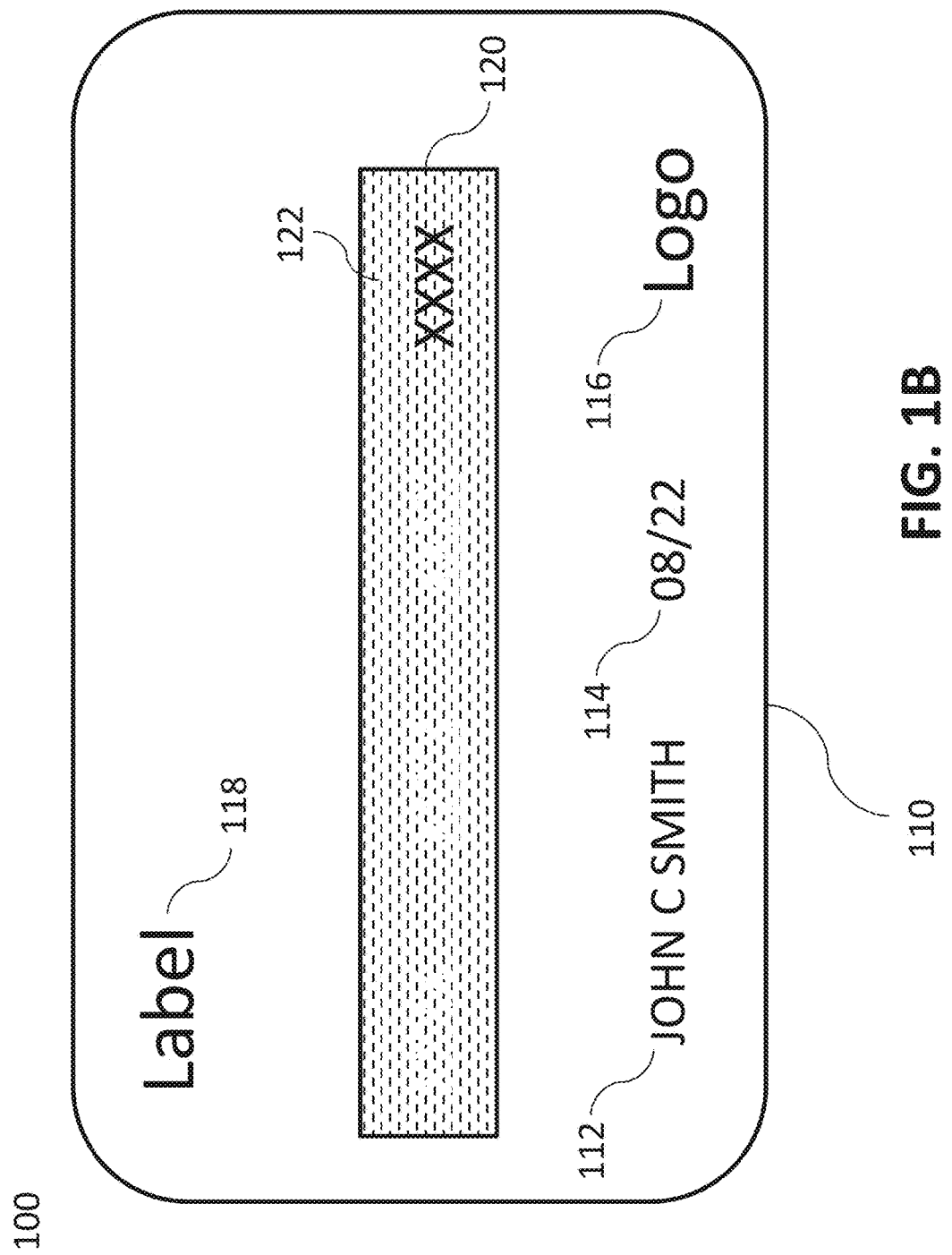
FIG. 1B depicts an exemplary credit card device, consistent with disclosed embodiments.

An initial overview of chromogenic features is provided immediately below, followed by specific exemplary embodiments of cards and methods for providing a card with an obscurable account identifier. The initial overview is intended to aid in understanding some of the useful technology and features relevant to the material systems and methods disclosed herein, but it is not intended to limit the scope of the claimed subject matter.

Chromogenic materials are a class of smart materials which are also called "intelligent," "responsive," or "functional." Smart materials have properties that significantly change in an unconventional way based on external stimuli. A smart material's properties will change in an unconventional way after sufficient exposure to external stimuli, i.e. an "activation point" (sometimes called a "hysteresis loop"). For instance, a conventional metal merely compresses when undergoing compression forces, but a smart metal (e.g., a piezoelectric metal) may change its surrounding electricity field when exposed to triggering compression beyond an activation point, in addition to compressing.

Smart materials are grouped together based on their unusual responses to various external stimuli triggers. For example, piezoelectric materials produce a voltage when stress is applied, and, conversely, application of a voltage across a piezoelectric material produces stress forces within the material. Thus, suitable designs can be made with piezoelectric materials to bend, expand, or contract a component by merely applying a voltage across that component. Further, the smart materials can be designed with various triggering activation point. So, for example, one component containing a piezoelectric material could be designed to bend, expand, or contract at voltage x, and another component containing a second piezoelectric material could be designed to bend, expand, or contract at voltage y. Other smart materials include shape-memory alloys (material deforms based on temperature stimuli); photomechanical materials (change shape under exposure to light); photovoltaic materials (convert light to electric current); halochromic materials (change color as a result of acidic stimuli); and chromogenic materials (change color in response to various stimuli) to name a few.

Chromogenic materials change their optical properties in response to an external stimulus. For many chromogenic materials, the triggering chromism is based on a change in the electron states, in particular the 7C- or d-electron states. The triggering chromism is often induced by an external stimuli altering the electron density for a given electron state, and thus, altering the chromogenic material's optical properties. The change in optical properties is not limited to the light spectrum, but encompasses the entire Electro-Magnetic ("EM") spectrum radiation. For instance, the change in optical properties may be evident by a stimulated (reversible) color change, an absorption of light, a reflection of light, a transparency to light, or even the absorption/reflection/transparency of any EM radiation (with wavelengths, $\lambda$, in $\mu m$). Some chromogenic materials may react to radiation (e.g., react to UV waves), while others may emit radiation (e.g., emit UV waves). Chromogenic materials include photochromism features (optical property change caused by light); thermochromism features (optical property change caused by heat); electrochromism features (optical property change caused by an electric current); halochromism features (optical property change caused by a change in acidity); mechanochromism features (optical property change caused by mechanical actions); tribochromism features (optical property change caused by friction); piezochromism features (optical property change caused by mechanical pressure); and radiochromism features (optical property change caused by radiation), to name a few.

Chromogenic materials are often produced as thin films or dyes that can be applied on surfaces, generally the exterior surface exposed to the external triggering stimuli. Chromogenic dyes may also be added to a substrate; such as in a liquid mixture or within gels and encapsulated by the substrate.

Reference will now be made in detail to exemplary embodiments, examples of which are illustrated in the accompanying drawings and disclosed herein. Wherever convenient, the same reference numbers will be used throughout the drawings to refer to the same or like parts.

The disclosed embodiments are directed to cards, for example, credit cards, and methods for obscuring identifiers on card surfaces. While some solutions exist for preventing credit card theft, none provide the elegance and simplicity discussed here. A credit card with sensitive information displayed with chromogenic materials presents a solution that prevents credit card theft. For instance, a credit card with a chromogenic feature, without any triggering activation (such as a user's body heat), obscures the account identifier. Thus a snooping thief is unable to see and copy the account identifier. Yet, the user is still able to access their account identifier, when needed to make a valid purchase, by merely applying body heat to, e.g., swiping their thumb across, the account identifier. The user's body applies the triggering heat to the chromogenic feature, thus revealing the account identifier information.

The following description provides examples of designs and methods for obscuring identifiers on card surfaces. The arrangement of components shown in the figures is not intended to limit the disclosed embodiments, as the components used in the disclosed methods may vary.

Turning now to FIGS. 1A-D, illustrative views of embodiments, of a credit card 100 in accordance with the principles of the invention, are depicted. Credit card 100 is depicted as a credit card, but similar methods may be used for other types of cards, e.g., identification cards, passports, etc. Credit card 100 may be any suitable material such as, for example, a somewhat rigid yet flexible material similar to that commonly used for identification cards, credit cards, etc. In one embodiment, credit card 100 is a substantially planar member formed of paper, cardstock, plastic (e.g., polycarbonate, polystyrene, polyvinyl chloride, acrylonitrile butadiene styrene, polyethylene terephthalate, Teslin, polyactide, and acrylic, to name a few), or other suitable material. In one embodiment, credit card 100 is formed of injection molded plastic or cut from sheet-stock plastic material. In one particular embodiment, the overall dimensions of credit card 100 are about 8.5 cm by about 5.5 cm wide with a thickness of less than about 1 mm. Credit card 100 can be formed in any other suitable planar or non-planar configuration as will be apparent to those of skill in the art upon reading this application.

Credit card 100 comprises one or more substrates as represented by front surface 110. On front surface 110, there is printed a text portion, like a conventional credit card, comprising the credit card's associated account holder name 112, card expiration date 114, card branding 116, and financial service provider (FSP) label 118. Less information or additional information or indicia may also appear on the surface of a credit card, e.g., a "member since" indicator. It is to be understood that the reference to "information" throughout this disclosure is intended to encompass single or plural items of information and reference to "indicia" throughout this disclosure is intended to encompass a single indicium or plural indicia. Account identifier 120 may also be printed on front surface 110.

Additionally, credit card 100 also comprises a back surface 130 (not depicted) that may likewise contain the some or all of the same information and/or other information or indicia. Back surface 130 may also contain a magnetic strip 132 (not depicted) and/or an electronic chip 134 (not depicted). Strip 132 and chip 134 may be used to store the same kind of information that is commonly stored in credit cards. However, it should be noted that non-conventional types of information may be stored on strip 132 or chip 134 and strip 132 or chip 134 may be located at any position on the back surface 130 or front surface 110.

Figure 1C:
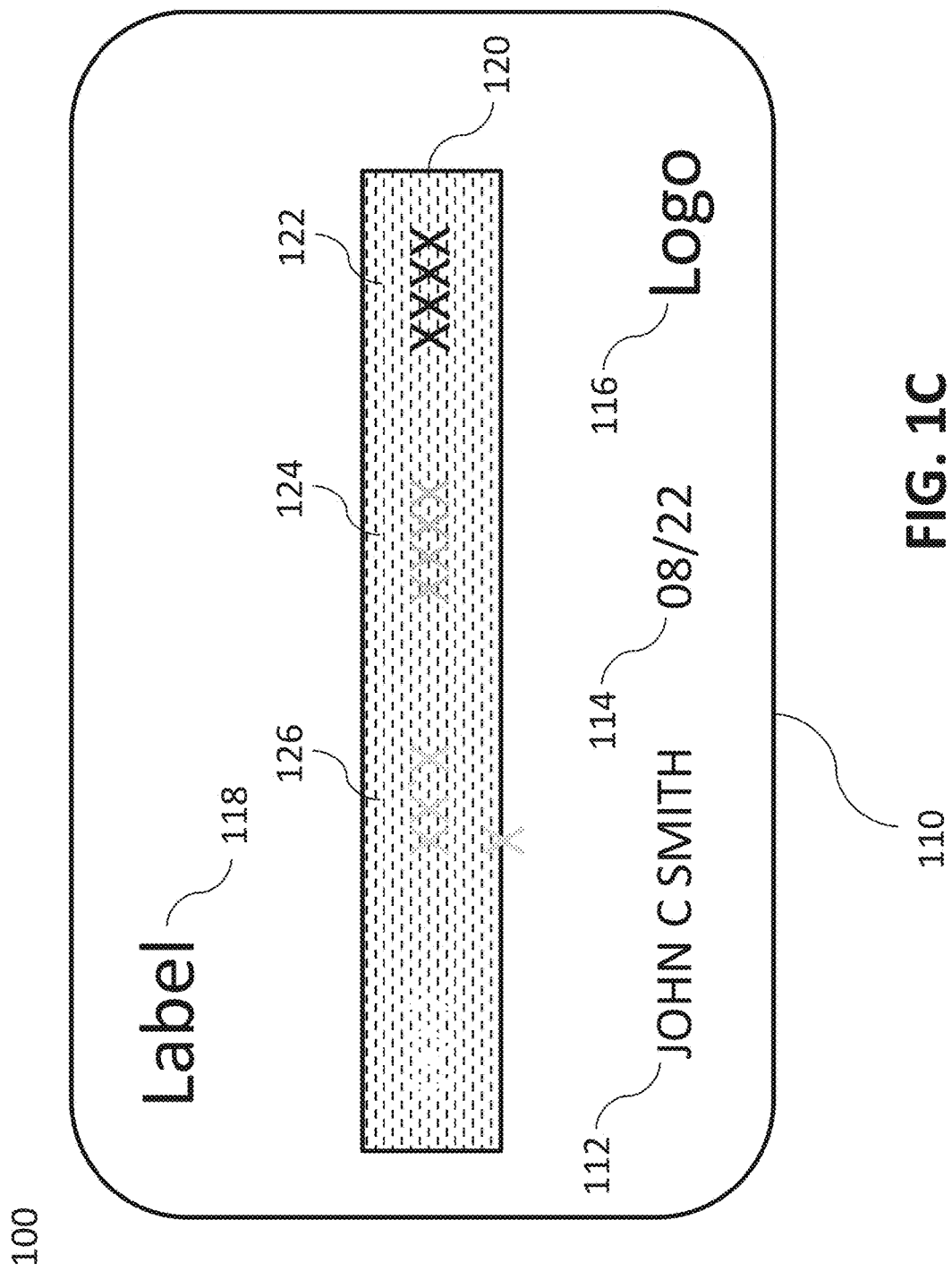
FIG. 1C depicts an exemplary credit card device, consistent with disclosed embodiments.
Figure 1D:
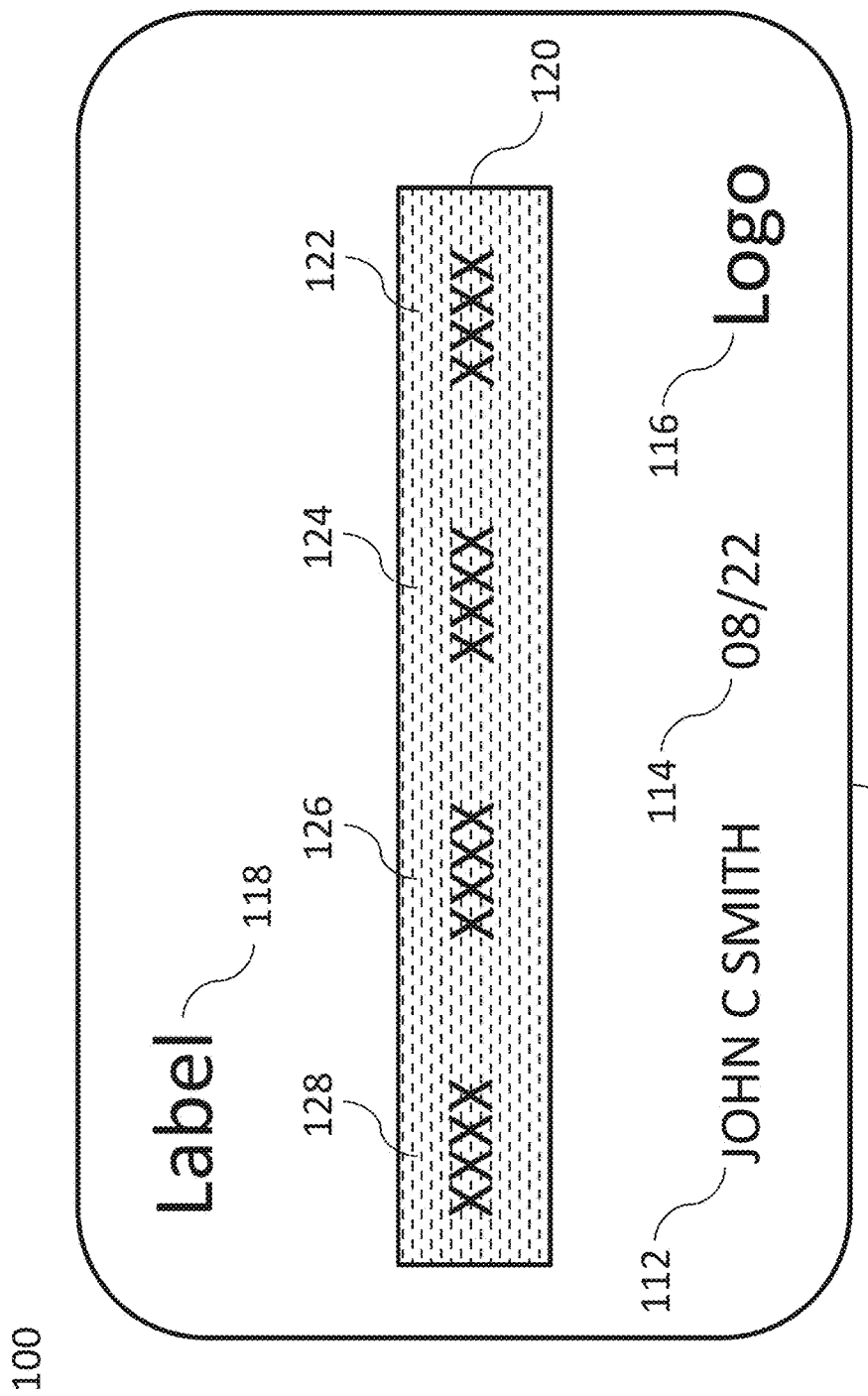
FIG. 1D depicts an exemplary credit card device, consistent with disclosed embodiments.

Printed information or indicia on credit card 100 may be printed with conventional ink through conventional means, such as depicted by elements 112-118. Additionally, printed information or indicia on credit card 100 may be printed with chromogenic features through means suitable for applying chromogenic features. For instance, FIG. 1A depicts account identifier 120 printed in thermochromic ink. As heat is applied to account identifier 120, the account identifier changes its optical properties, e.g., from transparent, i.e. see-through, to visible if a reflecting ink is used or from one color to another. FIG. 1B illustrates the triggering heat activation of the last four digits of account identifier 120, section 122, such that section 122 becomes visible after the application of heat (where it was transparent before the application of heat). FIG. 1C illustrates the triggering heat activation of the first twelve digits of account identifier 120, section 122, section 124, and section 126, such that sections 122-126 are visible after the application of heat to them. And lastly, 1D illustrates the triggering heat activation of the entire sixteen digits of account identifier 120, section 122, section 124, section 126, and section 128, such that sections 122-128 are visible after the application of heat. It should be further noted that account identifier 120 can comprise of any data identifying an account and is not limited to a sixteen digit number. Although FIGS. 1B-1D indicate heat activation revealing account identifier 120 in four-digit sections, it is to be understood that any section or portion of account identifier 120 may be rendered visible based on the application of triggering heat.

The heat activation temperature for the thermochromic ink may be uniform, or the heat activation temperature for different portions may be customized. For instance, the same thermochromic ink may be printed on sections 122-128 so that the entire account identifier 120 may be triggered at room temperature (approximately 23° C.) or body temperature (approximately 37° C.) such that the ink is transparent below the triggering temperature and reflective above the temperature. Alternatively, as another example, different thermochromic inks may be used to print various portions of account identifier 120 so, for example, sections 122-126 are triggered at room temperature but section 128 is triggered at body temperature. It is further understood by one skilled in the art that the thermochromic ink printed on sections 122-128 may be designed such that the triggered changing optical property vary from ink to ink. For instance, the printed thermochromic ink on sections 122-128 may change optical properties from transparency to reflection, absorption, or selective reflection/absorption (such that only certain wavelengths are reflected and/or certain other wavelengths are absorbed). Conversely, the thermochromic ink on sections 122-128 may be designed to change from reflecting/absorbing to transparent at the triggering activation temperature. The printed thermochromic ink on sections 122-128 may be designed and altered with respect to the features discussed throughout this specification. Additionally, it is further understood that the thermochromic inks will revert back to the original optical properties upon the removal of the activating trigger. For example, sections 122-128 discussed above with an activation trigger at room temperature could be reflective above room temperature, and conversely, the material would revert back to its original state, transparent, below room temperature.

It would be further understood by those skilled in the art that account identifier 120 can be printed with different thermochromic inks or different chromogenic features. For instance, section 122 could be printed with a first thermochromic ink with a heat activation temperature of l, section 124 with a second thermochromic ink with a heat activation temperature of m, section 126 with a third thermochromic ink with a heat activation temperature of n, and section 128 with a fourth thermochromic ink with a heat activation temperature of p. Alternatively, in another embodiment, section 122 could incorporate a thermochromic feature, section 124 and 126 could incorporate a photochromic feature, and section 128 could be incorporate a tribochromic feature.

It is further understood by those skilled in the art that account identifier 120 can be obscured (and only revealed by particular triggers) through various combinations incorporating properties of front surface 110 and the chromogenic features of account identifier 120. Like the thermochromic ink discussed above, the chromogenic features of account identifier 120 are be reversible upon the removal of the external stimuli. For example, in some embodiments, credit card 100 may contrast the natural color of front surface 110 with the trigger-activated color of chromogenic feature on account identifier 120 to obscure account identifier 120 when the trigger is not applied but to render account identifier 120 visible when the trigger is applied. For example, front surface 110 may be black and the thermogenic ink of account identifier 120 may be black when untriggered but white when triggered. Thus, in the untriggered state, the black ink of account identifier 120 is not visible against the black color of front surface 110, but when the activation trigger is applied, the white ink of account identifier 120 is visible against front surface 110. Additionally, in some embodiments, credit card 100 can be further designed to obscure (and reveal) the account identifier 120 through optical property gradients, such as an increase in application of an activating trigger causes more account revealed (i.e. 20° C. versus 35° C.), or more activating triggers applied in particular locations causes more account revealed (i.e. rubbing lightly versus rubbing hard). Obscuring account identifier 120 is not limited to the methods discussed in FIGS. 1A-D.

Turning now to FIGS. 2A-G, illustrative views of credit card 200, another embodiment of a credit card in accordance with the principles of the invention, are depicted. Much like the embodiments depicted in FIGS. 1A-D, credit card 100 shown in FIGS. 2A-E also comprises front surface 220 and back surface 230 (not depicted). Additionally, substrate 210 is embedded in front surface 220. Credit card 200 also comprises 222, 224, 226, and 228. Additionally, credit card 200 may comprise magnetic strip 132 (not depicted) and/or an electronic chip 134 (not depicted) as described above.

Figure 2A:
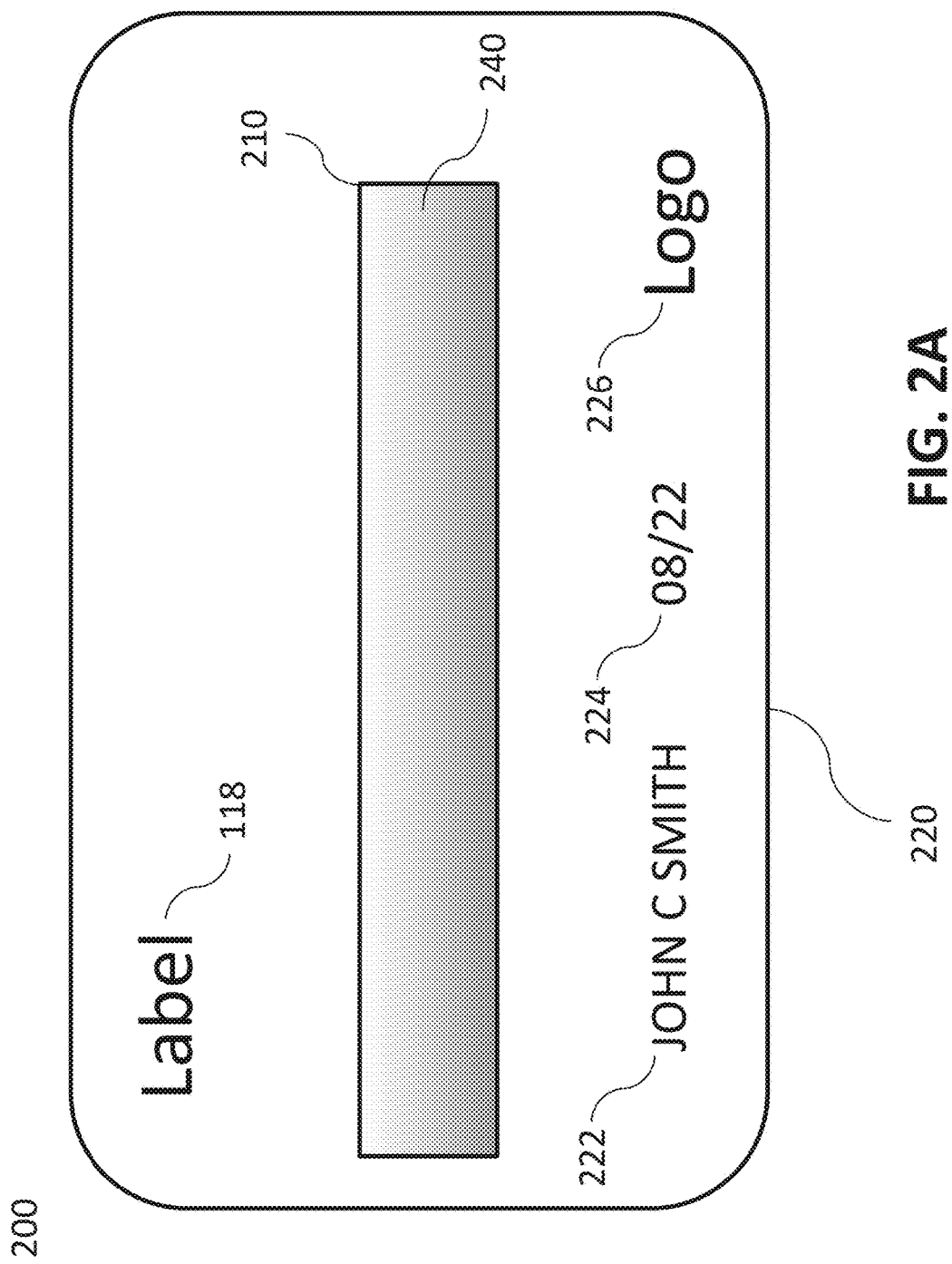
FIG. 2A depicts an exemplary credit card device, consistent with disclosed embodiments.

Credit card 200, as illustrated in FIG. 2A, may comprise transparent substrate 210. In addition to the suitable materials discussed above for credit card 100, credit card 200 in some embodiments may further comprise the transparent substrate 210 with a material that is also rigid yet flexible. More specifically, in one embodiment, transparent substrate 210 is a substantially planar substrate formed of a transparent plastic discussed here within. Additionally, transparent substrate 210 may contain a chromogenic feature within or any of its surfaces.

In one particular embodiment, the overall dimensions of credit card 200 are about 8.5 cm by about 5.5 cm wide a thickness of less than about 1 mm. Credit card 200 can be formed in any other suitable planar or non-planar configuration as will be apparent to those of skill in the art upon reading this application.

Printed information or indicia on credit card 200, such as sections 222-228, may be printed with conventional ink through conventional means. Additionally, printed information or indicia on credit card 200 may be printed with chromogenic features through means suitable for applying chromogenic features. Moreover, account identifier 240, in one embodiment, may be printed in a chromogenic feature, such as thermochromic ink, on top of transparent substrate 210.

Figure 2B:
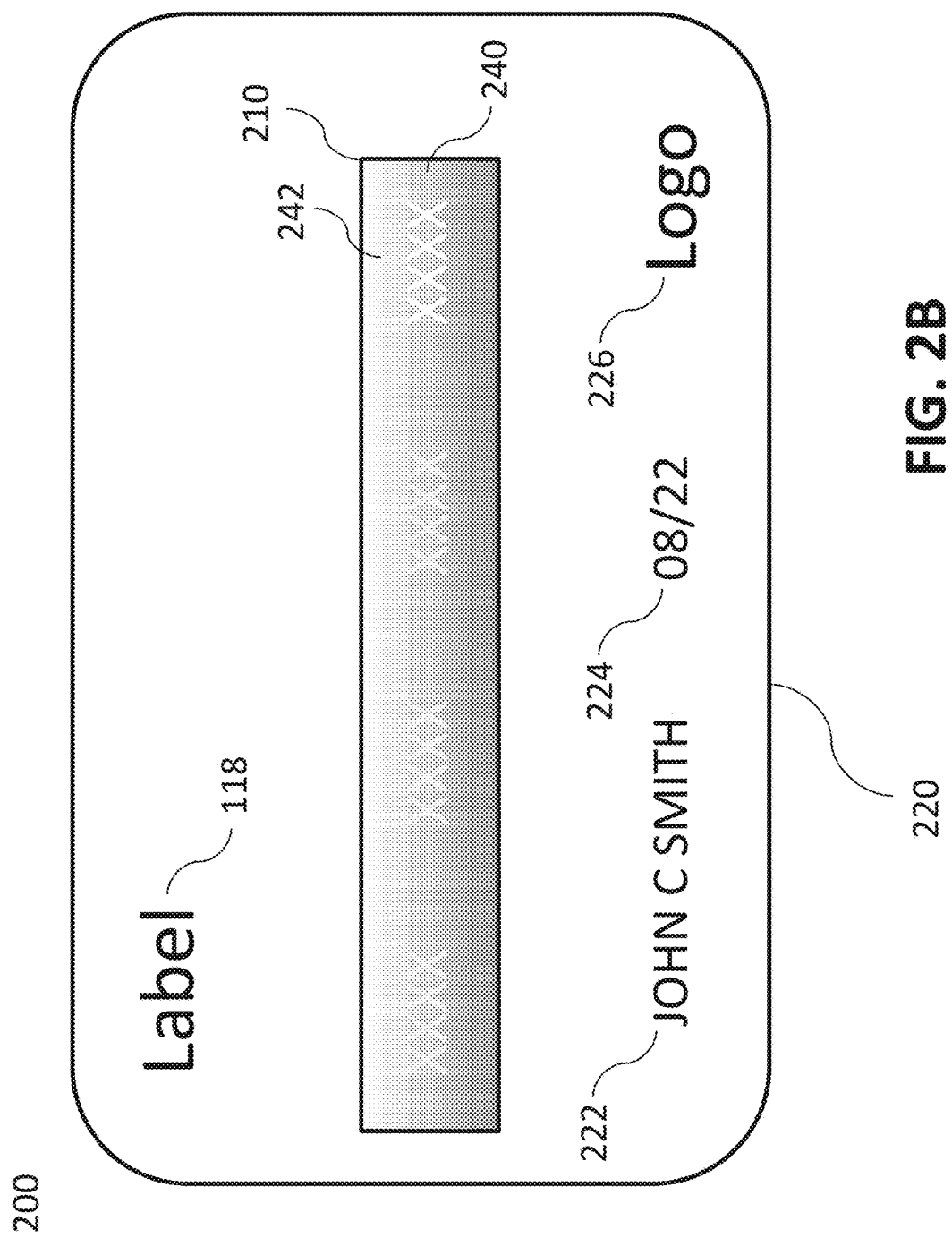
FIG. 2B depicts an exemplary credit card device, consistent with disclosed embodiments.
Figure 2C:
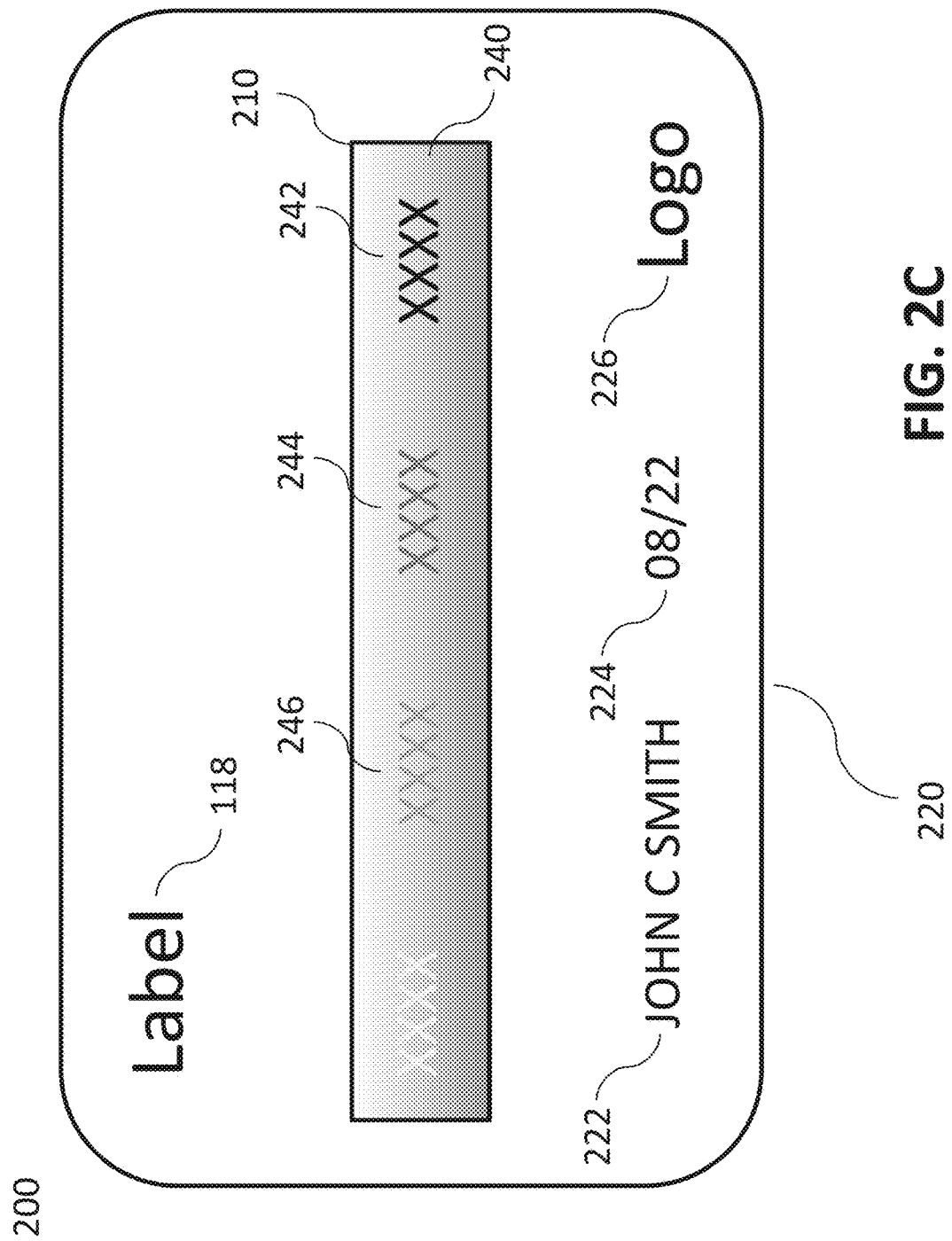
FIG. 2C depicts an exemplary credit card device, consistent with disclosed embodiments.
Figure 2D:
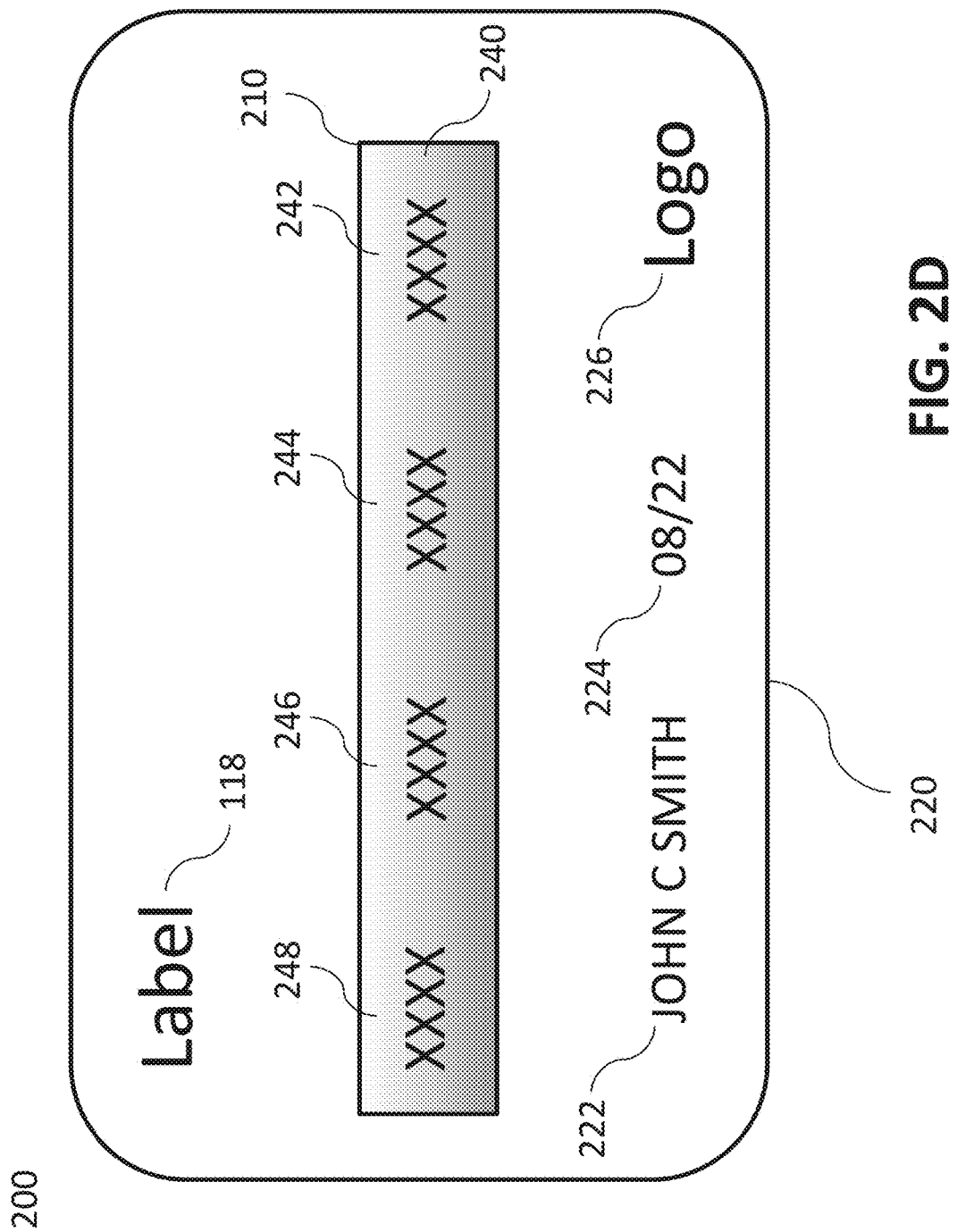
FIG. 2D depicts an exemplary credit card device, consistent with disclosed embodiments.

For instance, FIG. 2A depicts the account identifier 240 printed in thermochromic ink on top of transparent substrate 210. As heat is applied to the account identifier 240, portions of account identifier change their optical properties from transparent to visible (i.e. reflecting ink color). FIG. 2B illustrates the triggering heat activation of the last four digits of account identifier 240, section 242, such that section 242 becomes visible after the application of heat (where it was transparent before the application of heat). FIG. 2C illustrates the triggering heat activation of the first twelve digits of account identifier 240, section 242, section 244, and section 246, such that sections 242-246 are visible after the application of heat to them. And lastly, FIG. 2D illustrates the triggering heat activation of the entire sixteen digits of account identifier 240, section 242, section 244, section 246, and section 248, such that sections 242-248 are visible after the application of heat. It should be further noted, that like account identifier 120 above, account identifier 240 can comprise of any data identifying an account and is not limited to a sixteen-digit number. Although FIGS. 2B-2E indicate heat activation revealing account identifier 240 in four-digit sections, it is to be understood that any section or portion of account identifier 240 may be rendered visible based on the application of triggering heat.

The heat activation temperature for account identifier 240, i.e., thermochromic ink printed on sections 242-248, may be customized for particular circumstances. For instance, thermochromic ink printed on sections 242-248 may be designed to trigger at room temperature (approximately 23° C.) or alternatively at body temperature (approximately 37° C.), such that the ink is transparent below the triggering temperature and reflective above the temperature. It is further understood by one skilled in the art that the thermochromic ink printed on sections 242-248 may be designed such that the triggered changing optical property vary from ink to ink. For instance, the printed thermochromic ink on sections 242-248 may change optical properties from transparency to reflection, absorption, or selective (such that only certain color wavelengths are reflected and others are absorbed). Conversely, the thermochromic ink on sections 242-248 may be designed to change from reflecting/absorbing to transparent at the triggering activation temperature. The printed thermochromic ink on sections 242-248 may be designed and altered with respect to the features discussed throughout this specification.

It would be further understood by those skilled in the art that account identifier 240 can be printed with different thermochromic inks or different chromogenic features. For instance, section 242 could be printed with a first thermochromic ink with a heat activation temperature of l, section 244 with a second thermochromic ink with a heat activation temperature of m, section 246 with a third thermochromic ink with a heat activation temperature of n, and section 248 with a fourth thermochromic ink with a heat activation temperature of p. Alternatively, in another embodiment, section 242 could incorporate a thermochromic feature, section 244 and 246 could incorporate a photochromic feature, and section 248 could incorporate a tribochromic feature.

Figure 2E:
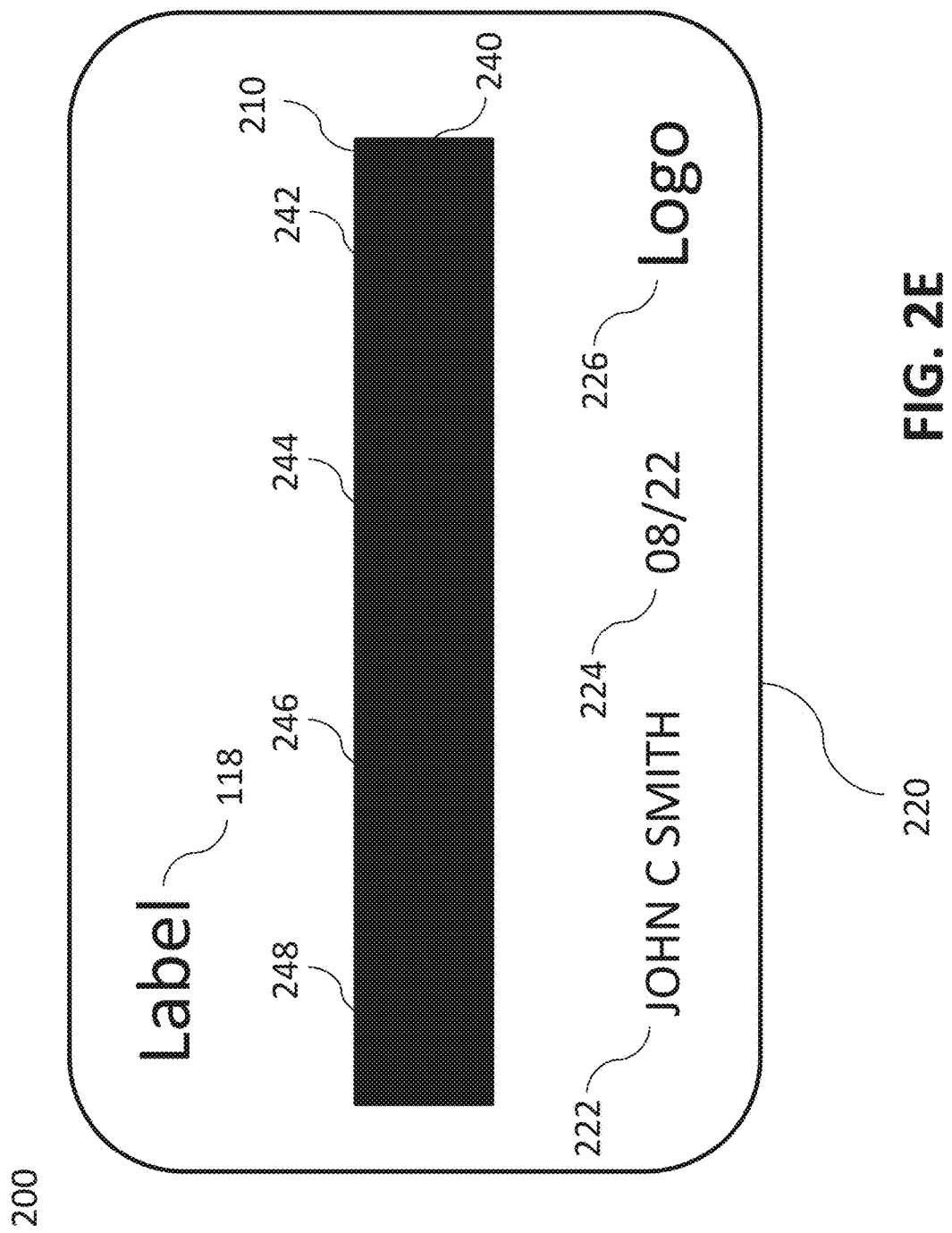
FIG. 2E depicts an exemplary credit card device, consistent with disclosed embodiments.

FIG. 2E further illustrates an embodiment where transparent substrate 210 comprises a chromogenic feature. Transparent substrate 210 may change optical properties from transparent to opaque based on an external stimulus. For instance, in one embodiment, substrate 210 may comprise a photochromic feature such that exposure to sunlight changes substrate 210 from transparent to opaque. Alternatively, in another embodiment, substrate 210 may comprise a thermochromic feature that changes from transparent to opaque at a particular temperature. Additionally, sections 242-248 may be printed with chromogenic features, such as thermochromic ink, or alternatively, they may be printed in conventional ink. In one embodiment, where sections 242-248 are printed in conventional ink, substrate 210 chromogenic feature may be designed to change optical properties such that application of the trigger results in the substrate 210 obscuring the conventional ink sections 242-248 (e.g., sections 242-248 and substrate 210 appear the same color when the trigger is applied). Such a chromogenic feature may be beneficial, for example, when a user's credit card is left on a restaurant table in the sun too long. In this embodiment, snooping thieves will be deprived of access to the account identifier 240 because it is obscured in the sunlight. Alternatively, in another embodiment, where sections 242-248 are printed in thermochromic ink, substrate 210 may be designed to change optical properties such that above its triggering activation point, substrate 210 matches the thermochromic ink sections 242-248 above their respective activation temperatures (e.g., sections 242-248 and substrate 210 appear the same color above all respective triggering activation points). Alternatively, in another embodiment, where sections 242-248 are printed in thermochromic ink, and sections 242-248 and substrate 210 chromogenic feature have the same triggering activation point such that above the respective activation temperature sections 242-248 and substrate 210 all appear in different colors. Alternatively, in another embodiment, where sections 242-248 are printed in thermochromic ink, sections 242-248 my have be triggered by the same activation stimulus (e.g., heat) and substrate 210 activated by a different stimulus (e.g., friction), such that the account identifier 240 is visible upon the triggering of both activation points. Thus, account identifier may be obscured by multiple means, either with combinations of chromogenic features on sections 242-248 or from substrate 210.

It is further understood by those skilled in the art that account identifier 240 can be obscured (and only revealed by particular triggers) through various combinations incorporating front surface 220, the chromogenic features of substrate 210, and the chromogenic features printed on account identifier 240. FIGS. 2F-G illustrates one such pairing. In FIGS. 2F-G, depicting the side view of credit card 200, credit card 200 utilizes the natural color of front surface 220, the chromogenic feature of substrate 210, and the chromogenic feature account identifier 240 to obscure and/or reveal account identifier 240 (e.g., creating a black/white or positive/negative space. For instance, in one embodiment, FIG. 2F represents an unactivated state for credit card 200. The front surface 220 may be black, and in the unactivated state, the substrate 210 may be transparent. Additionally, in the unactivated state the chromogenic ink for section 244 is transparent; whereas, the commercial ink for section 242 appears black. Thus, in the unactivated state, only portions of account identifier 240, i.e. section 242, are visible. In the activated state, shown in FIG. 2G, the front surface 220 and section 242 remain black. The substrate 210 may be opaque (i.e. black) in the activated state, thus obscuring section 242. Section 244 remains transparent until it is activated and turns to a color other than black, thus becoming visible against activated substrate 210 (opaque). Additionally, in another embodiment, the optical property pairings could be arranged such that section 242 is visible on top of substrate 210 at one state, and 244 is obscured; while, in another state, section 242 is obscured and section 244 is visible.

Additionally, in some embodiments, credit card 200 can be further designed to obscure (and reveal) the account identifier 240 through optical property gradients, such as an increase in application of an activating trigger causes more account revealed (i.e. 20° C. versus 35° C.), or more activating triggers applied in particular locations causes more account revealed (i.e. rubbing lightly versus rubbing hard). Obscuring account identifier 240 is not limited to the methods discussed in FIGS. 2A-G.

Figure 3:
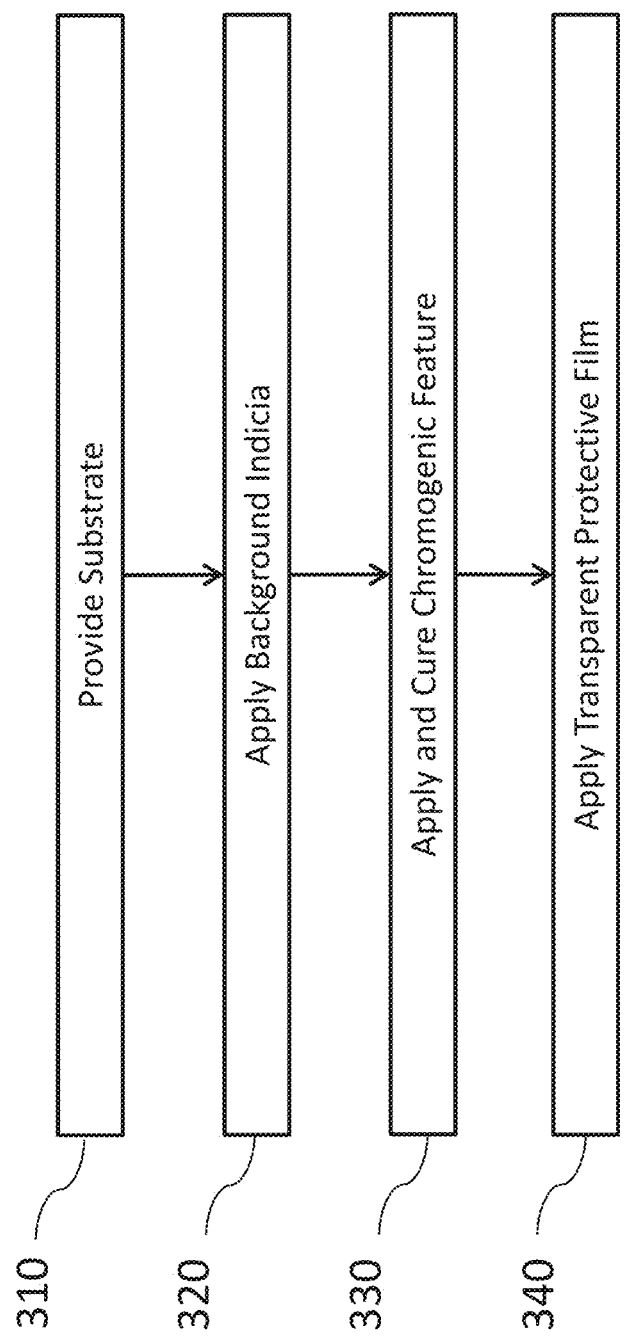
FIG. 3 is a flowchart of an exemplary method for providing a credit card with an obscurable account identifier.

Methods are also disclosed for providing a credit card with an obscurable account identifier, for example, as illustrated in FIG. 3. In step 310, a substrate is provided. The provided substrate may be any suitable material, such as a somewhat rigid yet flexible material similar to those commonly used for identification cards, credit cards, etc. More specifically, in one embodiment, the substrate is a substantially planar member formed of paper, cardstock, plastic (e.g. polycarbonate, polystyrene, polyvinyl chloride, acrylonitrile butadiene styrene, polyethylene terephthalate, Teslin, polyactide, and acrylic, to name a few), or other suitable material. The substrate may be reflective, transparent, or absorbing of EM spectrum energy.

In step 320, background indicia are applied on top of a front surface of the substrate provided in step 310. The background indicia may cover the entire front surface of the substrate provided in step 310 or only portions of the front substrate surface. Alternatively, the background indicia may consist of multiple indicia covering the entire front surface of the substrate, or only portions of the front substrate surface. Additionally, second background indicia may be applied to the back surface of the substrate provided in step 310. The second background indicia may be the same as or different from the first background indicia.

In step 330, a chromogenic material having a chromogenic feature is applied to the front surface, on top of the background indicia applied in step 320. The chromogenic material may cover the entire indicia applied in step 310 or only portions of the indicia. Alternatively, the chromogenic material may consist of multiple chromogenic materials covering the entire indicia or only portions of the indicia. Additionally, the chromogenic materials may comprise of any the chromogenic materials described herein and cured by their normal means. Additionally, another chromogenic material having a chromogenic feature may be applied to the back surface of the provided substrate, covering any applied background indicia from step 320.

In step 340, a transparent protective film may be applied. This protective film may be applied on top of the chromogenic feature applied in step 330 and cover the indicia applied in step 310, such that the protective film covers the entire front surface of card. Additionally, another protective film may be applied to the back surface of the provided substrate, covering any applied background indicia from step 320 and/or any chromogenic materials applied from step 330.

Figure 4:
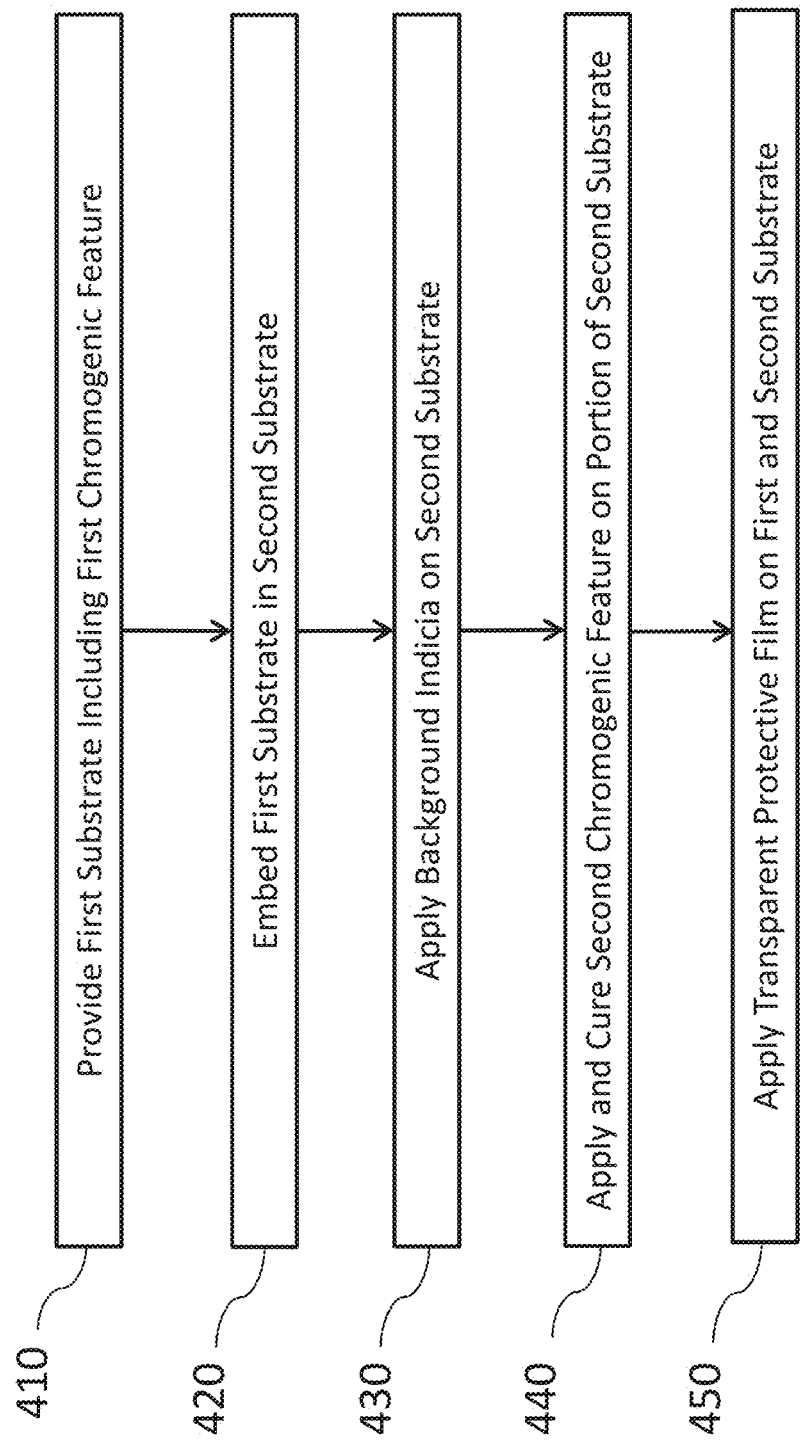
FIG. 4 is a flowchart of an exemplary method for providing a credit card with an obscurable account identifier.

Methods are also provided for providing a credit card with an obscurable account identifier, for example, as illustrated in FIG. 4. In step 410, a first substrate is provided. The first provided substrate may be any suitable material, that is somewhat rigid yet flexible, that also contains a first chromogenic feature. The chromogenic feature may be any consist of any chromogenic material discussed in this specification.

In step 420, a second substrate comprising a first chromogenic material is embedded into the first substrate. The embedded second substrate is flush with the first substrate such that the first substrate front surface is adjacent to and appears continuous with the top of the second substrate surface, and the back surface of the first substrate surface is adjacent to and appears continuous with the back surface of the second substrate surface. Alternatively, in another embodiment, the second substrate is not flush with the first substrate at the back surface but is embedded into the first substrate, such that only the first substrate front surface is adjacent to and appears continuous with the top of the second substrate surface, and the back surface comprises the first substrate but not the second substrate. The second substrate may be any suitable material such it is somewhat rigid yet flexible material similar to that commonly used for identification cards, credit cards, etc. More specifically, in one embodiment, the substrate is a substantially planar member formed of paper, cardstock, plastic (e.g. polycarbonate, polystyrene, polyvinyl chloride, acrylonitrile butadiene styrene, polyethylene terephthalate, Teslin, polyactide, and acrylic, to name a few), or other suitable material. The second substrate may be reflective, transparent, or absorbing of EM spectrum energy.

In step 430, a background indicia is applied on the front surface of card, i.e., over the front surfaces of one or both the first and second substrates. The background indicia may cover the entire front surfaces of the first and second substrates, only a portion of the front surfaces of the first and second substrates, only the front surface of first substrate, only the front surface of the second substrate, only a portion of the front surface of the first substrate, or only a portion of the front surface of the second substrate. The background indicia may consist of multiple indicia. Additionally, second background indicia may be applied to the back surface of the card, similar to the application of the background indicia to the front surface.

In step 440, a second chromogenic material is applied to the front surface of the card. The second chromogenic material may be applied anywhere on the surface, for example, it may be applied to a portion of the second substrate. The second chromogenic material may cover the entire indicia applied in step 430, only portions of the indicia, or may be directly applied to the substrate (e.g., if no indicia were applied to the portion where the second chromogenic material is to be applied). Additionally, the second chromogenic material may comprise any the chromogenic materials described herein.

One of ordinary skill in the art would understand that multiple chromogenic materials may be embedded and/or applied to the card, consistent with the embodiments described herein. For example, a credit card may contain multiple embedded substrates with chromogenic features and may contain multiple applied chromogenic materials. Moreover, the chromogenic materials may be applied anywhere on the surface of the card (e.g., directly to the first substrate, directly to a second or subsequent embedded substrate, onto a background indicia, etc.). The chromogenic feature of the embedded substrates and the applied chromogenic materials may be the same or different; they may have the same activating triggers or different; and even for the same activating triggers they may have degrees of activation points.

In step 450, a transparent protective film may be applied. This protective film is applied to the front surface of the card, i.e., on top of any second chromogenic features applied in step 440, any indicia applied in step 430, and any substrate provided in steps 410-420. Additionally, protective film may be applied to the back surface of the card, i.e., on top of any second chromogenic feature, indicia, or substrate.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The elements in the claims are to be interpreted broadly based on the language employed in the claims and not limited to examples described in the present specification or during the prosecution of the application, which examples are to be construed as non-exclusive. It is intended, therefore, that the specification and examples be considered as exemplary only, with a true scope and spirit being indicated by the following claims and their full scope of equivalents.

What is claimed is:

1. A credit card with an obscurable account identifier comprising:
   a substrate defining a first surface with a photochromic feature, wherein:
   the photochromic feature is capable of changing from a first state and a second state based on an activating trigger,
   in the first state, the photochromic feature appears with a first optical property that obscures the account identifier, wherein the first optical property absorbs visible light or reflects light, and
   in the second state, the photochromic feature appears with a second optical property that reveals the account identifier, wherein the second optical property does not absorb visible light or does not reflect visible light.

2. The credit card of claim 1, wherein the activating trigger of the photochromic feature is exposure to sunlight.

3. The credit card of claim 1, wherein the activating trigger of the photochromic feature is exposure to light wavelengths between about 0.29 μm and about 3.2 μm.

4. The credit card of claim 1, wherein the photochromic feature is further capable of changing back to the first state from the second state after removal of the activating trigger.

5. A method of providing a credit card, the method comprising:
   printing a background on at least a portion of a first surface of a substrate; and
   printing an account identifier for a user account on a portion of the background in thermochromic ink, where:
   a portion of the account identifier is printed with a first thermochromic ink and another portion of the account identifier is printed with a second thermochromic ink,
   the first and second inks are configured to transition between a respective first optical appearance and a second optical appearance when the thermochromic inks are heated above a respective activation temperature
   the first optical appearance renders the respective thermochromic ink substantially invisible against the background and the second optical appearance renders the respective thermochromic ink visible against the background, and
   the activation temperature of the first thermochromic ink is lower than the thermochromic second ink.

6. The method of claim 5, wherein:
   the activation temperatures are between about 20° C. and about 40° C.

7. The method of claim 5, further comprising curing the first and second thermochromic inks under ultra-violet light.

8. The method of claim 5, wherein the first and second thermochromic inks are further configured to transition back to the respective first optical appearance from the second optical appearance after removal of the respective activating trigger.

9. The method of claim 5, wherein the respective activation temperature is reached by application of human body heat.

10. A method of providing a credit card, the method comprising:
    a substrate having a surface;
    printing an account identifier for a user account on the surface in thermochromic ink, where the ink is configured to transition between a first optical appearance and a second optical appearance when the thermochromic ink is heated above an activation temperature; and
    covering the printed account identifier with a photochromic feature configured to transition between a first optical appearance and a second optical appearance when the photochromic feature is radiated by light wavelengths between about 0.29 μm and about 3.2 μm.

11. The method of claim 10, wherein:

the activation temperature is between about 20° C. and about 40° C.; and the first optical appearance of the photochromic feature renders the thermochromic ink visible between about 20° C. and about 40° C. and the second optical appearance of the photochromic feature renders the thermochromic ink invisible.

12. The method of claim 11, wherein:

a portion of the account identifier is printed with a first thermochromic ink and another portion of the account identifier is printed with a second thermochromic ink; and wherein the activation temperature of first ink is lower than the second ink.

13. The method of claim 5, wherein the respective first optical appearance reflects visible light; and the respective second optical appearance does not reflect visible light.

14. The method of claim 5, wherein the respective first optical appearance absorbs visible light; and the respective optical property does not absorb visible light.

15. The method of claim 5, wherein the respective first optical appearance is transparent to light wavelengths between about 0.29 μm and about 3.2 μm; and the respective second optical property is not transparent to light wavelengths between about 0.29 μm and about 3.2 μm.

* * * * *